US008601182B2

(12) United States Patent
Nishita et al.

(10) Patent No.: US 8,601,182 B2
(45) Date of Patent: Dec. 3, 2013

(54) DATA COMMUNICATION CONTROL DEVICE

(75) Inventors: Satoru Nishita, Kahoku (JP); Yuichi Ogawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 609 days.

(21) Appl. No.: 12/382,748

(22) Filed: Mar. 23, 2009

(65) Prior Publication Data

US 2009/0248903 A1 Oct. 1, 2009

(30) Foreign Application Priority Data

Mar. 28, 2008 (JP) ................................ 2008-088296
Dec. 15, 2008 (JP) ................................ 2008-318822

(51) Int. Cl.
*G06F 3/00* (2006.01)

(52) U.S. Cl.
USPC .......... 710/52; 710/5; 710/53; 710/57; 710/58

(58) Field of Classification Search
None
See application file for complete search history.

(56) References Cited

U.S. PATENT DOCUMENTS

| | | | | |
|---|---|---|---|---|
| 5,386,582 A | * | 1/1995 | Ebert | 377/44 |
| 5,388,237 A | * | 2/1995 | Sodos | 710/22 |
| 5,664,116 A | * | 9/1997 | Gaytan et al. | 709/234 |
| 5,765,032 A | * | 6/1998 | Valizadeh | 709/235 |
| 6,014,722 A | * | 1/2000 | Rudin et al. | 710/240 |
| 6,230,219 B1 | * | 5/2001 | Fields et al. | 710/22 |
| 6,246,680 B1 | * | 6/2001 | Muller et al. | 370/389 |
| 6,868,461 B1 | * | 3/2005 | Mirkhani et al. | 710/56 |
| 6,912,637 B1 | * | 6/2005 | Herbst | 711/167 |
| 7,206,857 B1 | * | 4/2007 | Mammen et al. | 709/238 |
| 7,337,248 B1 | * | 2/2008 | Rao et al. | 710/53 |
| 7,603,488 B1 | * | 10/2009 | Gravenstein et al. | 710/22 |
| 7,739,428 B2 | * | 6/2010 | Matsutani | 710/57 |
| 8,010,751 B2 | * | 8/2011 | Yang et al. | 711/147 |
| 2003/0233503 A1 | * | 12/2003 | Yang et al. | 710/100 |
| 2005/0076163 A1 | * | 4/2005 | Malalur | 710/22 |
| 2007/0174511 A1 | * | 7/2007 | Yu et al. | 710/36 |
| 2009/0125647 A1 | * | 5/2009 | Shasha et al. | 710/22 |

FOREIGN PATENT DOCUMENTS

| | | |
|---|---|---|
| JP | 2001-249770 | 9/2001 |
| JP | 2002-342252 | 11/2002 |

* cited by examiner

*Primary Examiner* — Steven Snyder
(74) *Attorney, Agent, or Firm* — Fujitsu Patent Center

(57) ABSTRACT

A data communication control device. The data communication control device includes, a controller comprising a first data storing part, the first data storing part including multiple channels, each channel being applied to store a command for data transfer based on a destination of data, the controller executing the command stored in the channel from the head to transfer data and, an overall controller storing the command in the channel of the first data storing part when the number of commands in a certain channel is not over a upper limit, and stopping to store the command in the channel of the first data storing part and creating a second data storing part and storing the command in the second data storing part when the number of commands in a certain channel is over the upper limit.

10 Claims, 14 Drawing Sheets

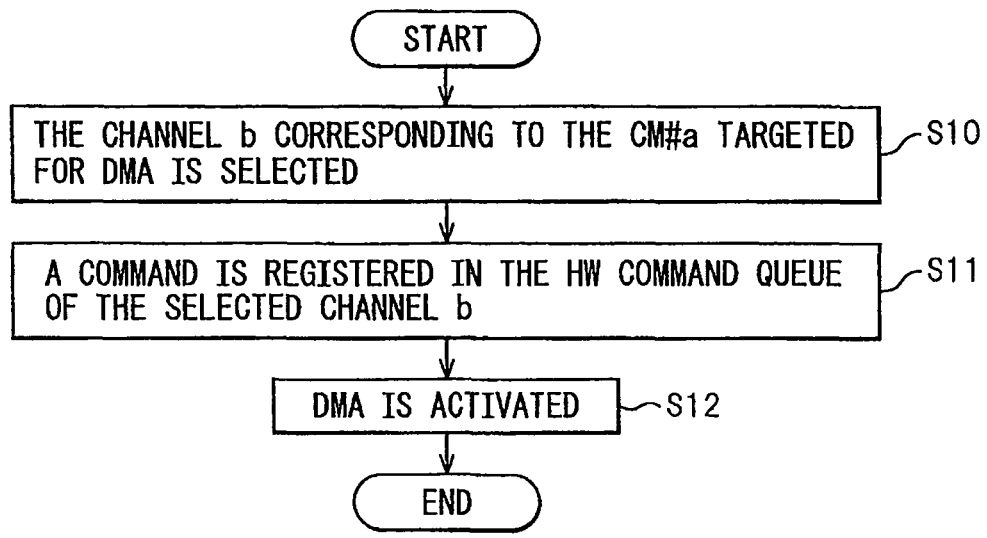
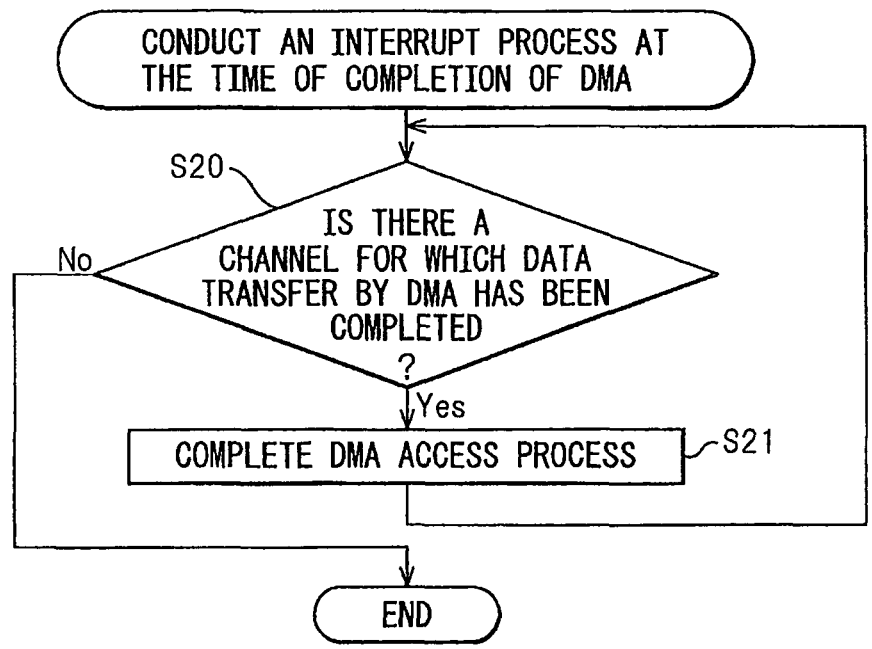

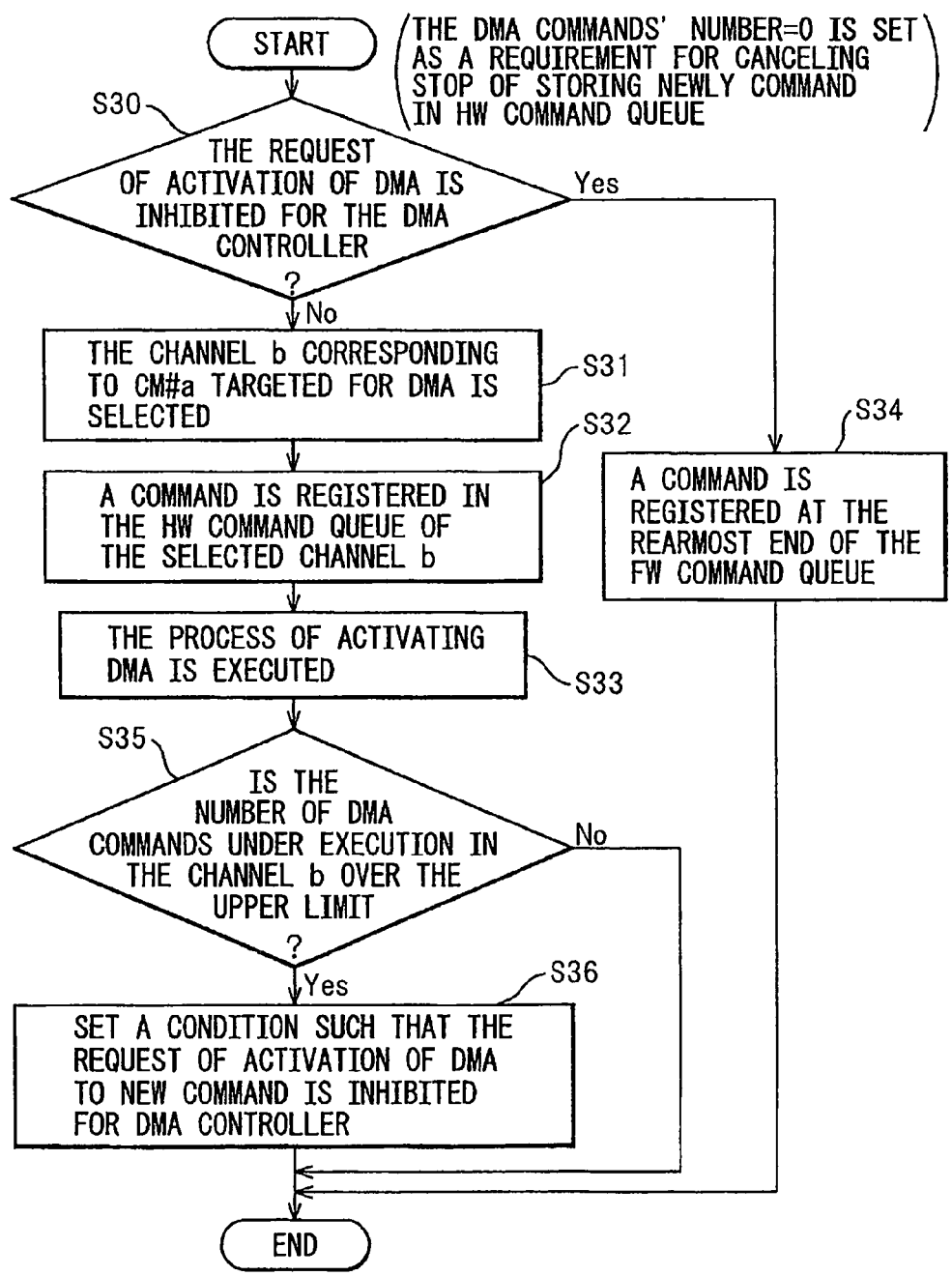

DATA COMMUNICATION CONTROL DEVICE

CROSS-REFERENCE TO RELATED APPLICATIONS

This application is based upon and claims the benefit of priority of the prior Japanese Patent Application No. 2008-88296, filed on Mar. 28, 2008, and the prior Japanese Patent Application No. 2008-318822, filed on Dec. 15, 2008, the entire contents of which are incorporated herein by reference.

FIELD

The embodiment discussed herein is directed to a data communication control device.

BACKGROUND

The structure and operation of a conventional data communication control device to be contrasted with a data communication control device hereof will be described below with reference to FIGS. 1 to 5.

FIG. 1 is a block diagram illustrating the structure of a data communication control device to be contrasted with the data communication control device hereof. FIG. 2 is a block diagram illustrating the relation between a direct memory access controller in the data communication control device of FIG. 1 and a hardware command queue. Hereinafter the direct memory access is also referred to as "DMA", and the hardware command queue is also referred to as "HW command queue" for short. In the drawing, of a plurality of controller modules, seven controller modules 110-1 to 110-7 (CM#0 to CM#6) are illustrated on-behalf of them.

As illustrated in FIG. 1, in the conventional data communication control device 100, DMA controllers 120-1 to 120-7 are provided in the controller modules 110-1 to 110-7 respectively. Further, channels CH0 to CH6 are prepared corresponding to the controller modules 110-1 to 110-7 respectively (see FIG. 2). The controller modules 110-1 to 110-7 each have a host interface provided in an entrance portion, which will be connected to an outside server (not illustrated in FIG. 1). The controller modules 110-1 to 110-7 control data transfer using direct memory access executed between the controller modules 110-1 to 110-7 according to a request from the outside server. The data sent out from a certain controller module is transferred to other controller module of transfer destination through a switch unit 130, which is a communication path between the controller modules.

Further, the controller modules 110-1 to 110-7 of FIG. 1 each have: a CPU (Central Processing Unit) 140-1 to 140-7 which serves as firmware for overall controlling various constituents in the controller module including the DMA controller 120-1 to 120-7; and a memory unit 160-1 to 160-7 including a memory for holding various kinds of data transferred from the outside server and various programs and others for executing data transfer using direct memory access between the controller modules. The CPUs 140-1 to 140-7, memory units 160-1 to 160-7, DMA controllers 120-1 to 120-7 and others are mutually connected by respective memory controller hubs 150-1 to 150-7. It is noted that the memory controller hubs are abbreviated to MCH in FIG. 1. Herein, "firmware" refers to a combination of software and hardware necessary to control data communication between the controller modules.

Next, the structure of the inside of the DMA controllers and the specifications thereof will be described in outline with reference to FIG. 2. As illustrated in FIG. 2, a certain DMA controller (e.g. the first DMA controller 120-1 (CM#0)) controls data communication through direct memory access executed between controller modules. As many channels (e.g. CH0-CH6) as the controller modules of transfer destinations are prepared, one for each controller module.

In the corresponding DMA controller, each channel has a hardware data storing part (e.g. the hardware data storing part 60-1 in the DMA controller 120-1). The hardware data storing part is usually termed "hardware command queue (or HW command queue)", and is capable of holding data containing commands involved with data transfer requests. The commands (DC) in the HW command queue are executed from the head in order, and two or more commands are never executed concurrently in the HW command queue. Aside from the channels, the DMA controllers are provided with engines EG-1 and GE-2 which actually implement direct memory access. The number of the engines EG-1 and EG-2 is smaller than that of the channels. The engines EG-1 and EG-2 are shared by all the channels, and therefore they are not bound to a particular channel fixedly. Herein, the engines EG-1 and EG-2 acquire a command from a channel by a round-robin method to perform an appropriate process. However, the hardware of the DMA controllers has no knowledge of the order in which the commands were stuffed in the HW command queue. In this case, the controller modules having different characteristics are assigned different roles respectively, which produces a bias in process such that control data of a small size is transferred to a controller module and user data of a large size is transferred to another controller module.

FIG. 3 is a schematic diagram illustrating a situation where two or more commands are stuffed in the HW command queue of FIG. 2. FIG. 4 is a schematic diagram illustrating the way a new command is stuffed in the HW command queue of FIG. 3. FIG. 5 is a schematic diagram illustrating a situation where command sinking occurs in the channel 0 of the HW command queue of FIG. 4. Here, the mechanism of the occurrence of command sinking in a particular channel (e.g. channel 0) of the HW command queue will be described with reference to FIGS. 3 to 5.

First, it is assumed that commands have been stuffed in the HW command queue in the DMA controller as illustrated in FIG. 3 at a certain point of time. As is clear from the situation of FIG. 3, a larger number of commands (SDC) of small-size data are stuffed in the channel 0 (CH0), and a smaller number of commands (LDC) of large-size data are stuffed in the other channels (CH1-CH6). Here, the numerals (1-18) in the commands show the ordinal number of a process which is due to be executed at this point of time.

Next, as to the HW command queue in the situation of FIG. 2 it is assumed that new commands are stuffed in the channel 1 (CH1) and channel 2 (CH2) as illustrated in FIG. 4. In this case, although the commands have been issued in the nineteenth and twentieth turns originally, these commands in the channels 1 (CH1) and 2 (CH2) will be executed in the sixteenth and seventeenth turns as illustrated in FIG. 4. This is because the engines EG-1 and EG-2 pull the commands out of the channels 1 (CH1) and 2 (CH2) according to the round-robin method.

In other words, when a bias arises in the data size or number of commands involved with data transfer requests, an event such that a command of the channel 0 (CH0), which has been stuffed earlier, is passed by a command of another channel, which has been stuffed later, and the earlier stuffed command ends up being processed after the later stuffed one would take place.

As described above, when the bias in the data size or number of data remains between the channels, commands of other channels, which have been stuffed later, go ahead of a command of the channel 0 (CH0) of the HW command queue one after another as illustrated in FIG. 4, and the position of processing the command of the channel 0 in the sequence is changed in succession to latter one, e.g. twenty-first, . . . , ninety-eighth or ninety-ninth position. Thus, the problem that sinking of the command of the channel 0 (CH0) takes place, and the command of the Channel 0 is not processed within a prescribed length of time during which the firmware is monitoring, i.e. the command goes into time-out arises. As described above, the term "sinking" means that a condition such that the number of commands stored in a queue increases compared the number of commands stored in the other queues.

Such problem is attributed to the fact that the order of storing commands involved with different channels is not managed across the channels, and therefore one channel's command would pass another channel's command in the turn of command processing. This tendency is more remarkable as the biases in data size and number of data targeted by the commands stuffed in the HW command queue is larger.

The conventional data communication control device discloses a memory device, applying a measure to prevent sinking to a read command and a write command separately, managing the time when each command is received for the purpose of making the read command less prone to sink, and having a command queuing function for preferentially executing a command which has not been executed for a fixed length of time since the reception.

The conventional data communication control device discloses a method of activating an input-output device which includes: measuring the start stand-by time of an input/output instruction in an input/output processing device; verifying the start stand-by time each time the input/output instruction is extracted from an input/output queue; and preferentially executing the input/output instruction which has not been started while having been stored in the input/output queue.

Japanese Laid-open Patent Publication No. 2001-249770 and Japanese Laid-open Patent Publication No. 2002-342252 are disclosed.

SUMMARY

According to an aspect of the embodiment, a data communication control device is provided. The data communication control device including: a memory access controller including a first data storing part, the first data storing part including multiple channels, each channel being applied to store a command for data transfer based on a destination of data, the memory access controller executing the command stored in the channel from the head to transfer data; and, an overall controller storing the command in the channel of the first data storing part when the number of commands in a certain channel is not over a upper limit, and stopping to store the command in the channel of the first data storing part and creating a second data storing part and storing the command in the second data storing part when the number of commands in a certain channel is over the upper limit.

According to another aspect of the embodiment, a method for controlling a communication control device is provided. The method for controlling a communication control device, wherein the communication control device includes: a memory access controller including a first data storing part, the first data storing part including multiple channels, each channel being applied to store a command for data transfer based on a destination of the data, the memory access controller executing the command stored in the channel from the head to transfer data by direct memory access; and, an overall controller, the method including: storing, by the overall controller, the command in the channel of the first data storing part when the number of commands in a certain channel is not over a upper limit, and, stopping, by the overall controller, to store the command in the channel of the first data storing part and creating, by the overall controller, a second data storing part and storing, by the overall controller, the command in the second data storing part when the number of commands in a certain channel is over the upper limit.

The object and advantageous of the embodiment will be realized and attained by means of the elements and combinations particularly pointed our in the appended claims. It is to be understood that both the foregoing general description and the following detailed description are exemplary and explanatory only and are not restrictive of the invention, as claimed.

BRIEF DESCRIPTION OF THE DRAWINGS

In the following the embodiment will be described with reference to the accompanied drawings, in which:

FIG. 8 is a flow chart for explaining a DMA activation process in the data communication control device to be contrasted with the data communication control device hereof;

FIG. 9 is a flow chart for explaining a DMA completion process in the data communication control device to be contrasted with the data communication control device hereof;

FIG. 10 is a flow chart for explaining the DMA activation process when the DMA commands' number=0 is set as a requirement for canceling the stopping of the storing new command in the data communication control device according to the embodiment;

DESCRIPTION OF EMBODIMENTS

As described previously, the conventional data communication control device preferentially executes a command which has not been executed for a fixed length of time. However, the execution sequence of the commands stored in a queue should be changed, in order to accomplish such a priority processing. Therefore, even if a receiving device sends a request for a sending data with sending order to a sending device, the sending device does not send data based on the order since the sending device changes the order in order to send data within a fixed time that is determined by the sending device. The receiving device may receive the data in an order different from the sending order. Thus, although the sending device can execute a command within the fixed time, the receiving device may not be able to use the received data since the receiving device has to use the received data based on the above mentioned sending order. Further, in the conventional data communication control device, the later stored command in the channel can be processed before processing the earlier stored command in another channel. Therefore, the above mentioned "sinking" occurs and the earlier stored command can not be processed within a prescribed length of time. Preferred embroilments of the present invention will be explained with referenced to accompanying drawing (FIGS. 6 to 15).

Figure 6:
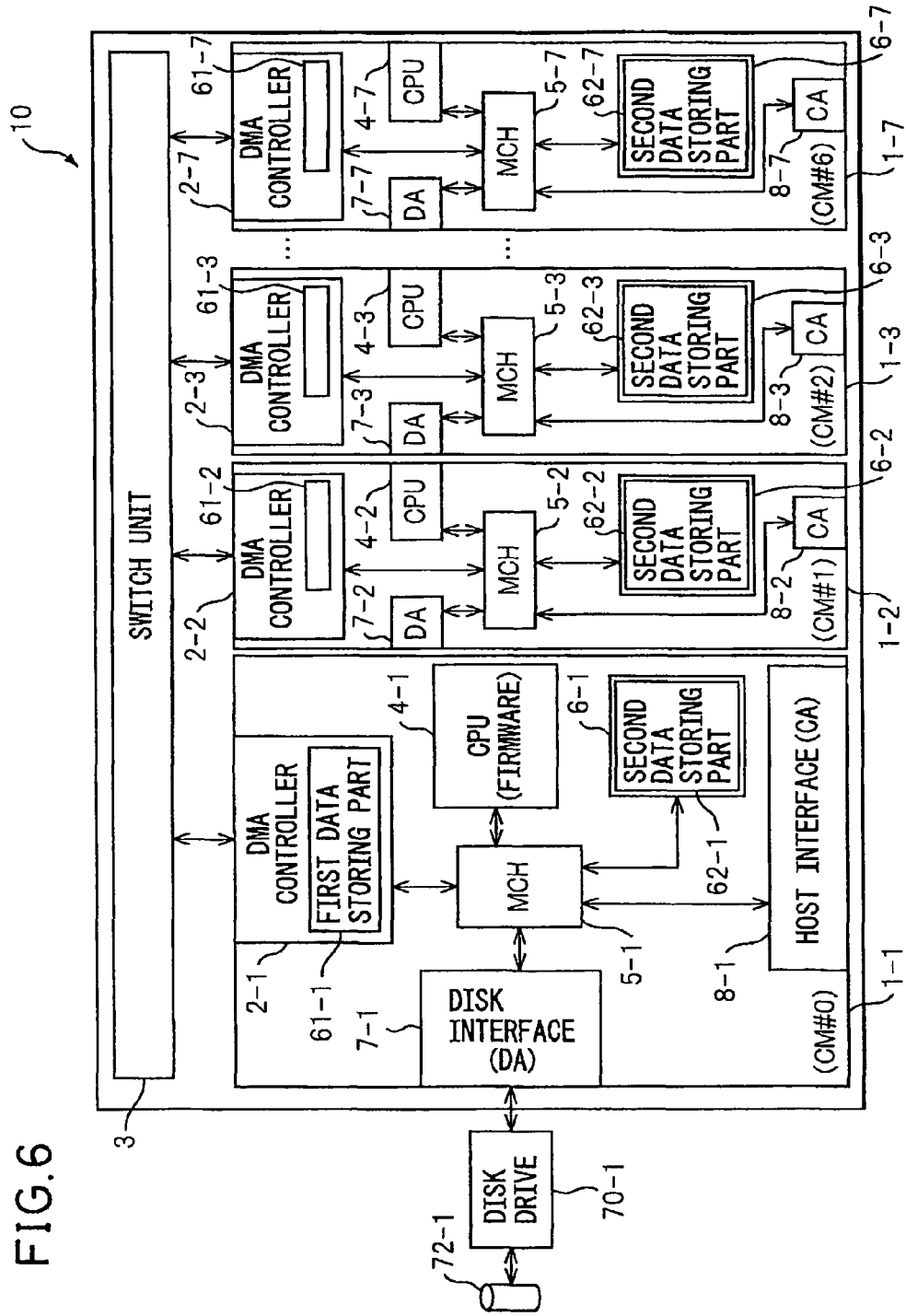
FIG. 6 is a block diagram illustrating a hardware structure of the data communication control device according to an embodiment hereof.
Figure 7:
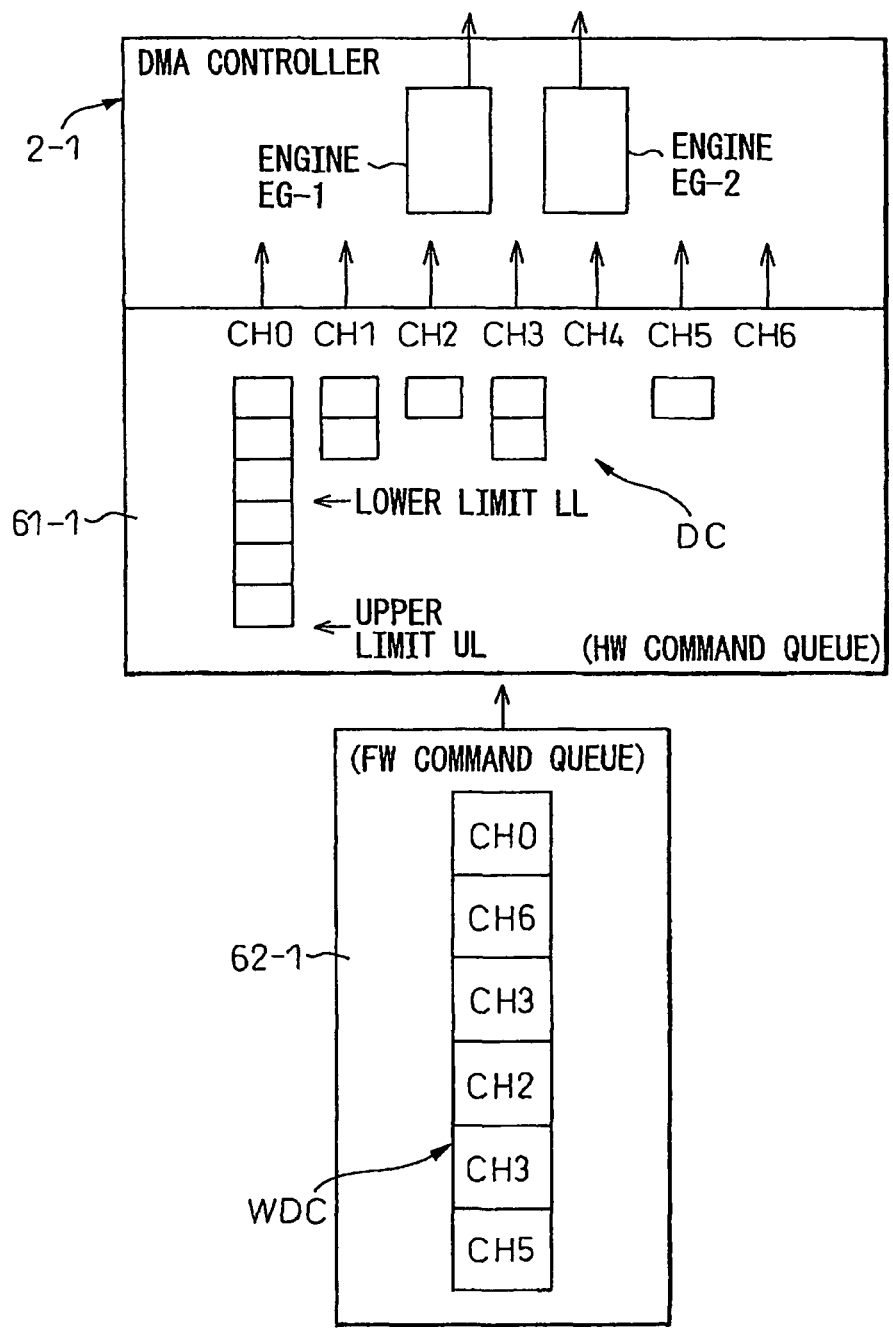
FIG. 7 is a block diagram illustrating the relation between a DMA controller, and an HW command queue and an FW command queue in the data communication control device of FIG. 6.

FIG. 6 is a block diagram illustrating a hardware structure of the data communication control device according to an embodiment. FIG. 7 is a block diagram illustrating the relation between a controller, and an HW command queue and an FW command queue in the data communication control device of FIG. 6. In the drawing, of a plurality of controller modules, seven controller modules 1-1 to 1-7 (CM#0 to CM#6) are illustrated on behalf of them as in the case of the data communication control device of FIG. 1 described above. Hereinafter, the same constituents as those described above shall be identified by the same reference numerals.

As illustrated in FIG. 6, in the data communication control device 10 according to the embodiment, controllers 2-1 to 2-7 are provided in the controller modules 1-1 to 1-7 respectively. Further, channels CH0 to CH6 (see FIG. 7) are prepared corresponding to the controller modules 1-1 to 1-7 respectively. Each controller module 1-1 to 1-7 has a host interface (CA) 8-1 to 8-7 provided in its first entrance portion, which is connected to an outside server. The controller modules 1-1 to 1-7 control data communication using direct memory access executed between the controller modules 1-1 to 1-7 according to a request from the outside server. Data sent out from a certain controller module (e.g. the first controller module 1-1 (CM#0)) is transferred to another controller module of the transfer destination through a switch unit 3, which is a communication path between the controller modules.

Further, the controller modules 1-1 to 1-7 of FIG. 6 each have a CPU (Central Processing Unit) 4-1 to 4-7 which serves as firmware for overall controlling various constituents in the controller module including the controller 2-1 to 2-7; and a memory unit 6-1 to 6-7 including a memory, such as RAM (Random Access Memory) or ROM (Read Only Memory), for holding various kinds of data transferred from the outside server and various programs and others for executing data communication through direct memory access between the controller modules. The CPUs 4-1 to 4-7 that execute the program stored in the memory unit 6-1 to 6-7 and that have several functionality specified in the programs are also referred to as "overall controller". Further, each controller module 1-1 to 1-7 has a disk interface (DA) 7-1 to 7-7 provided in its second entrance portion, which is connected to an external disk drive (disk device) (e.g. disk drive 70-1) or RAID device. Here, operations for data writing on and reading from a disk medium (e.g. disk medium 72-1) are performed between the CPUs 4-1 to 4-7 and external disk drive (e.g. disk drive 70-1) or RAID device through the disk interfaces (DA) 7-1 to 7-7.

Each controller module 1-1 to 1-7 of FIG. 6 further includes a memory controller hub (abbreviated to MCH in FIG. 6) 5-1 to 5-7 for mutually connecting the CPU 4-1 to 4-7, memory unit 6-1 to 6-7, controller 2-1 to 2-7 and the like.

Further, the controllers 2-1 to 2-7 of FIG. 6 each have a first data storing part 61-1 to 61-7 for temporarily holding data of a transfer destination in the channels which the controller modules 1-1 to 1-7 have respectively. On the other hand, each memory unit 6-1 to 6-7 of FIG. 6 has a second data storing part 62-1 to 62-7 for holding newly incoming data when the number of commands of a certain channel held in its first data storing part 61-1 to 61-7 exceeds a predetermined upper limit. Specific structures of the first data storing parts 61-1 to 61-7 and second data storing parts 62-1 to 62-7 is to be described later in detail with reference to FIG. 7.

Here, the relation between the controller, first data storing part and second data storing part will be described with reference to FIG. 7.

As illustrated in FIG. 7, a certain controller (e.g. the first controller 2-1 (CM#0)) controls data communication through direct memory access executed between controller modules. As many channels (e.g. CH0-CH6) as the controller modules of transfer destinations are prepared, one for each controller module.

The controller includes a first data storing part (e.g. the first data storing part 61-1 in the controller 2-1) which have multiple channels wherein each channel is applied to store a command for data transfer based on a destination of data subjected to the command. The first data storing part is usually termed "hardware command queue (HW command queue)" which is a queue implemented by hardware resource, and is capable of storing commands related to data transfer requests in a channel for a controller module designated as a destination of data subjected to the command. Incidentally, such commands each contain: a source memory address of memory part of a source controller module; information to designate a destination controller module; and the destination memory address of the memory part of the destination controller module. When the controller processes a command, data stored at the source memory address source is transferred to the destination memory address. The commands (DC) in the HW command queue are executed from the head in order, and two or more commands in the same HW command queue are never executed simultaneously. In addition to the channels, engines EG-1 and EG-2 which perform direct memory access actually are provided in the controller. The number of the engines EG-1 and EG-2 is smaller than that of the channels. The engines EG-1 and EG-2 are shared by all the channels, and therefore they are not bound to a particular channel fixedly. The engines EG-1 and EG-2 herein acquire a command from a channel according to the round-robin method to perform an appropriate process. The commands (DC) in the HW command queue are executed from the head in order, and two or more commands are never executed concurrently in the HW command queue.

As to the memory units 6-1 to 6-7 of FIG. 6 as described above, a second data storing part (e.g. the second data storing part 62-1 in the memory unit 6-1) managed by the CPU firmware is provided, one in each controller module. The second data storing part is usually termed "firmware command queue (or FW command queue)" which is a queue created by CPU that execute programs, and is capable of holding a command (WDC) which has been left over without being stored in the first data storing part and waiting to be executed.

As illustrated in FIG. 7, the upper limit UL of the number of commands which can be stuffed in the HW command queue is set in advance. Further, the lower limit LL of the number of commands which can be stuffed in the HW command queue is set previously, as required. Herein, "lower limit" refers to a threshold used to bring the controllers out of stop of activation of direct memory access after the number of commands which the controllers are executing exceeds the upper limit, and the controllers are brought into the stop. When data transfer by direct memory access is completed, and the number of commands under execution decreases below the lower limit, the controllers are brought out of stop of activation of direct memory access.

The CPU that execute firmware keeps executing the commands stuffed in the HW command queue from the head in order until the number of commands in a certain channel (e.g. the channel 0 (CH0)) reaches the upper limit UL. Further, in the case where the number of commands of a certain channel exceeds the upper limit UL, or the case where there is a command in the FW command queue even when the number of commands of a certain channel is not over the upper limit UL, the CPU firmware stops the operation of storing the HW command queue with a command, and holds a newly incoming command in the FW command queue. The new command held in the FW command queue is managed by the CPU that execute firmware as a command of an execution stand-by queue. At the time when the processes by the engines EG-1 and GE-2 are pursued further, and the number of commands stuffed in the HW command queue decreases below the lower limit LL, the commands held in the FW command queue are pulled out of the head and stored in the HW command queue. In addition, the commands stored in the HW command queue are executed from the head in order by controller.

The flow of the process by the CPU that executes firmware is as described in the following Steps (1) to (4).

Step (1), where the CPU makes a request for processing to a hardware part of the controller until the number of commands of a certain channel in the HW command queue reaches the upper limit UL as in a conventional case.

Step (2), where when the number of commands of a certain channel in the HW command queue reaches the upper limit UL, the CPU does not store a new command in the HW command queue and stops making a request for processing related to the new command to the hardware part of the controller, and stores the new command in the FW command queue.

Step (3), where after the hardware part of the controller pursues the process until the number of commands of a certain channel in the HW command queue decreases below the lower limit LL, the CPU firmware returns to the Step (1), and performs the normal process.

Step (4), where the CPU firmware repeats the above processes of Steps (1) to (3).

The function specified in firmware herein is materialized by execution of a program required for control of data communication by direct memory access utilizing the CPU mounted in each controller module. More specifically, when CPU reads out a program for executing control of data communication by direct memory access, which is stored in e.g. ROM of the memory unit 6-1, and various kinds of data necessary for execution of the program, which are stored in e.g. RAM and runs the program, the function of the software program of CPU is realized. Now, it is noted that ROM or RAM built in CPU may be used instead of ROM or RAM included in the memory unit 6-1.

The data communication control device according to the embodiment of FIGS. 6 and 7 is arranged so that a new command is held in the FW command queue when the number of commands of a certain channel stuffed in the HW command queue exceeds the upper limit, in which one FW command queue managed by CPU that executes firmware is prepared, the upper limit of the number of commands to be stuffed in the HW command queue is set in advance (the lower limit is also set previously as required). Also, the data communication control device is arranged so that at the time when the number of commands of all the channels stuffed in the HW command queue decreases below the lower limit, the commands held in the FW command queue are pulled out of the head and stored in the HW command queue, and the commands stored in the HW command queue are executed from the head in order.

Thus, the data communication control device according to the embodiments of FIGS. 6 and 7 makes shallower the depth of sinking of a command stuffed in the HW command queue, and makes possible to manage command left over without being stored in the HW command queue while keeping the data in the FW command queue. If the predetermined conditions are satisfied, the commands stored in the FW queue are transferred to the HW queue from the head in order. As a result, a command of a channel, which has been stuffed in the HW command queue earlier, is made less prone to being passed by a command of another channel, which has been stuffed later. The data communication control device can execute the commands stored in the HW command queue in predetermined order. Therefore, the data communication control device can send data based on the predetermined order, and, prevent the occurrence of sinking of the command stored earlier.

FIG. 8 is a flow chart for explaining a DMA activation process in the data communication control device to be contrasted with the data communication control device hereof. FIG. 9 is a flow chart for explaining a DMA completion process in the data communication control device to be contrasted with the data communication control device hereof. The DMA activation process and DMA completion process, which are executed by making the above-described CPU of FIG. 1 work, will be described here.

Figure 1:
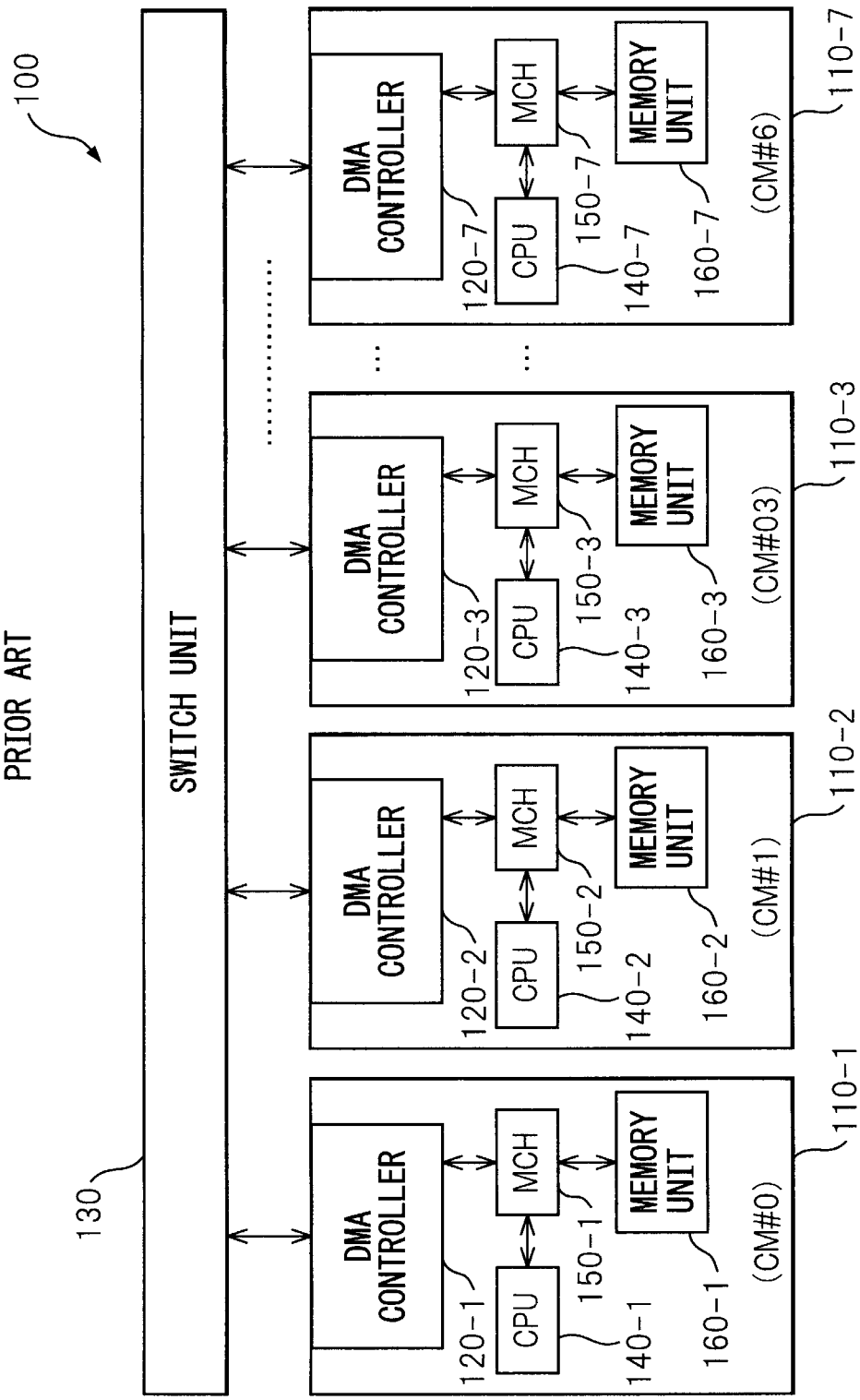
FIG. 1 is a block diagram illustrating the structure of a data communication control device to be contrasted with the data communication control device hereof.
Figure 2:
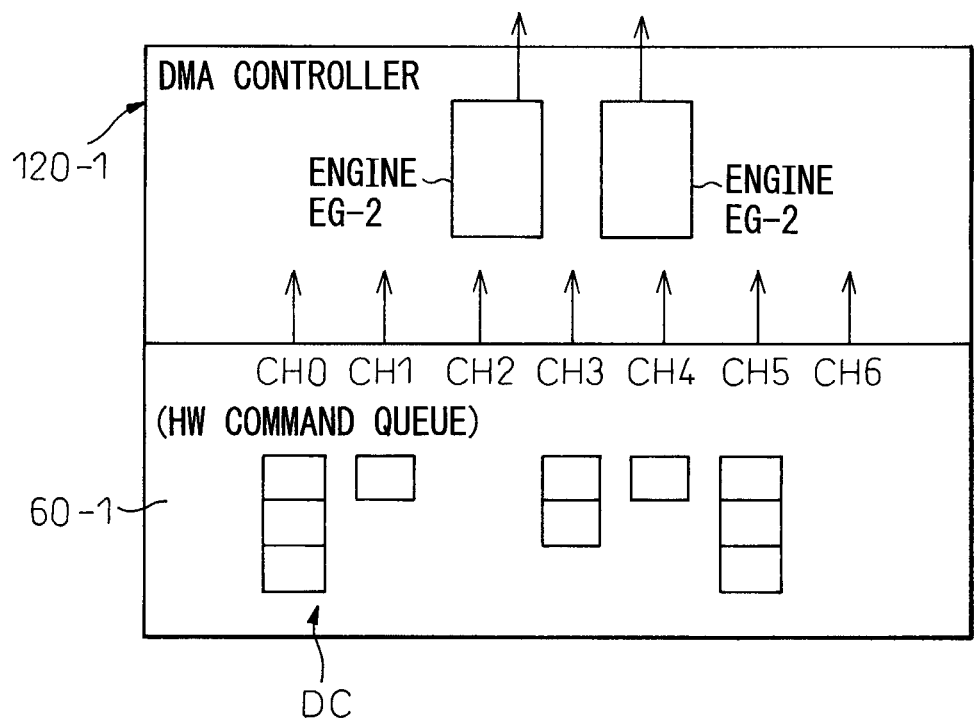
FIG. 2 is a block diagram illustrating the relation between a DMA controller in the data communication control device of FIG. 1 and an HW command queue.
Figure 3:
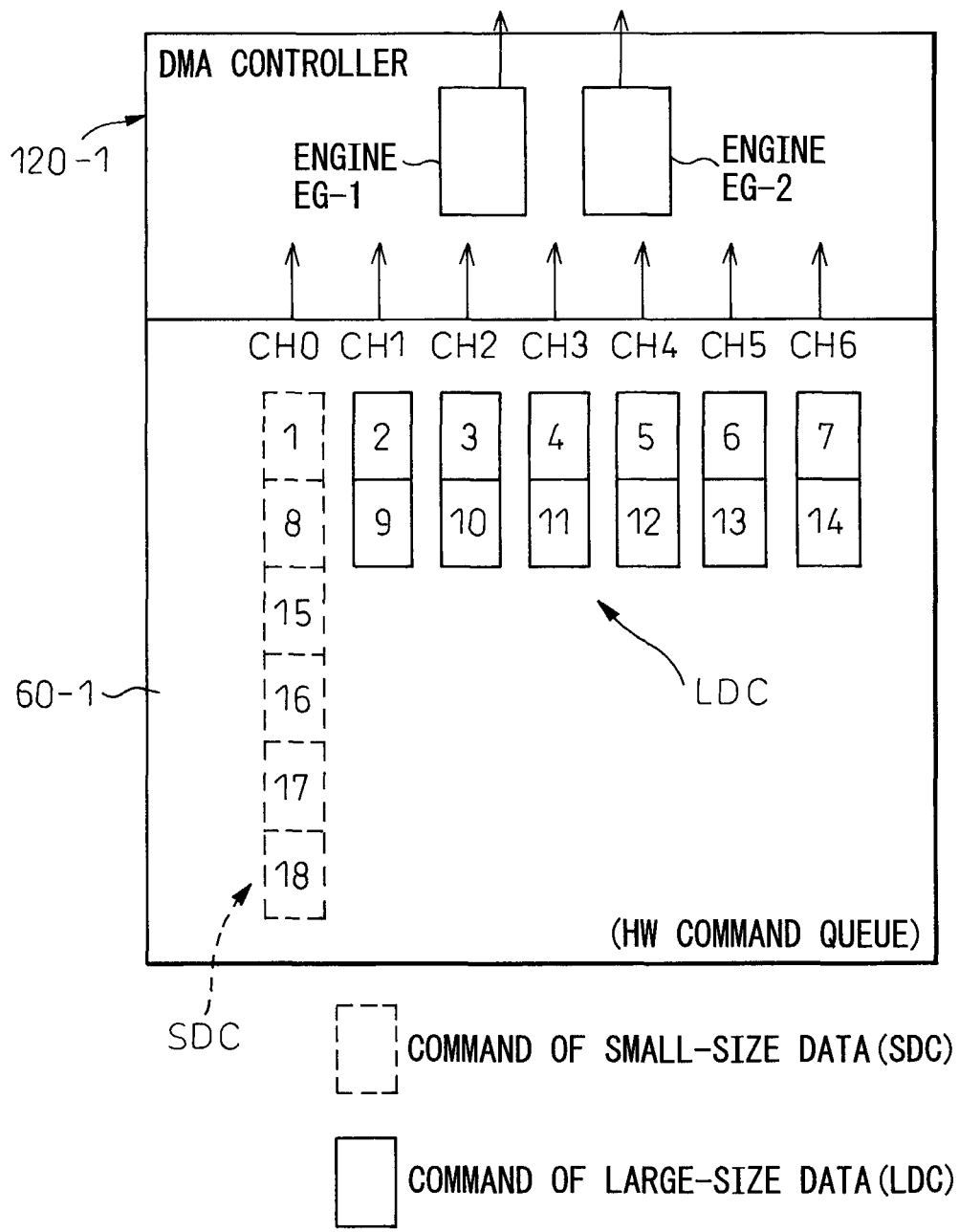
FIG. 3 is a schematic diagram illustrating a situation where two or more commands are stuffed in the HW command queue of FIG. 2.
Figure 4:
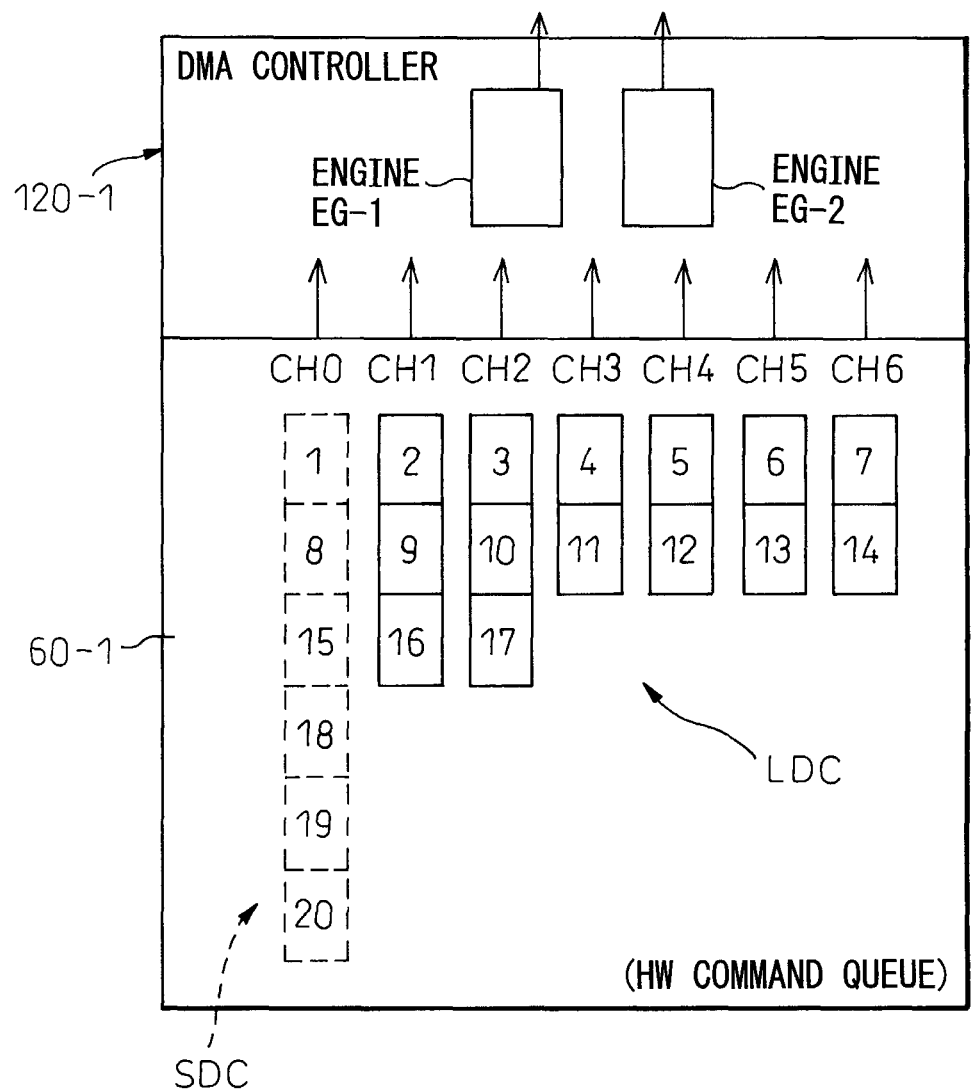
FIG. 4 is a schematic diagram illustrating the way a new command is stuffed in the HW command queue of FIG. 3.
Figure 5:
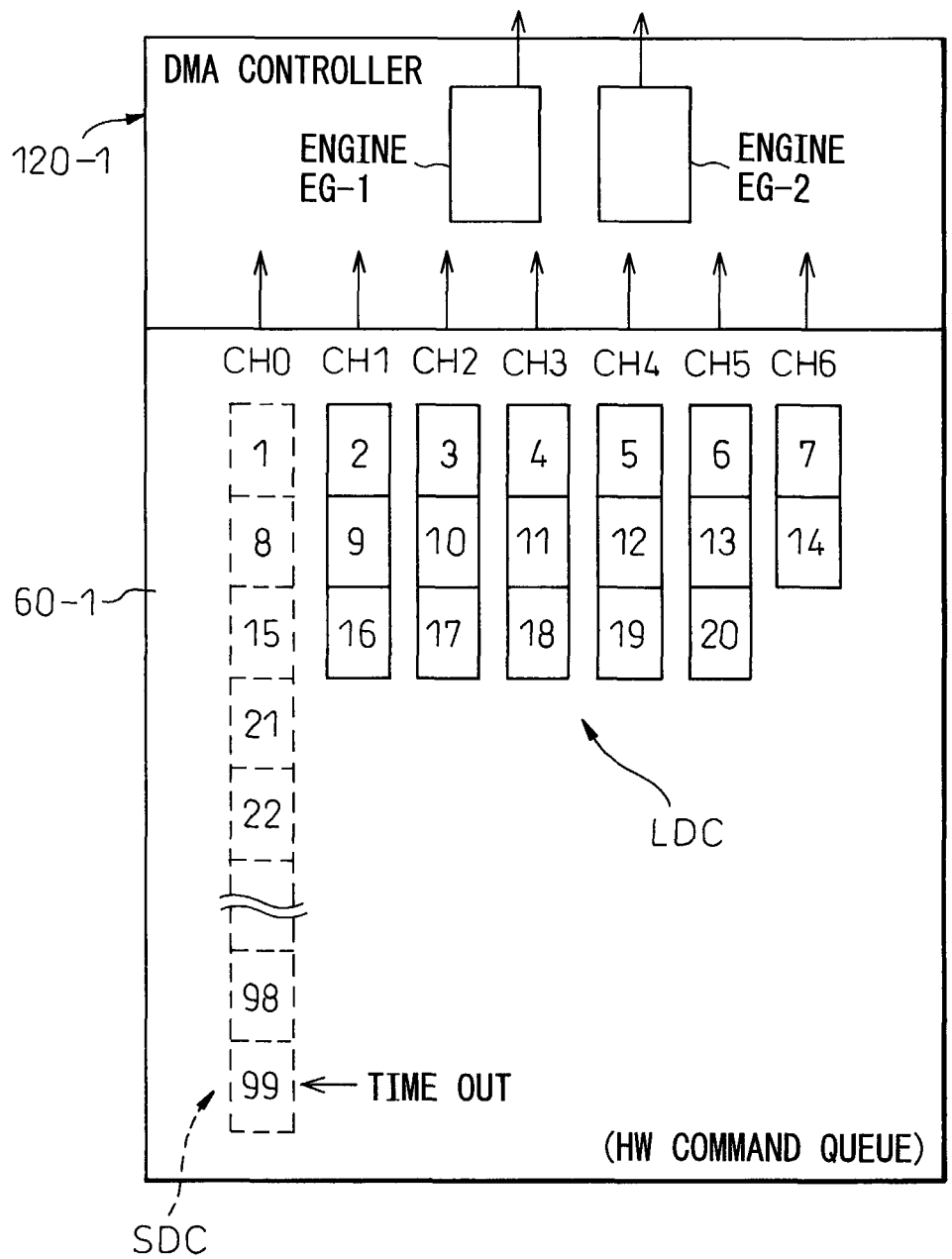
FIG. 5 is a schematic diagram illustrating a situation where command sinking occurs in the channel 0 of the HW command queue of FIG. 4.

In the case where the process of activating direct memory access is executed in the data communication control device of FIG. 1 as described above, the channel b (b is any positive integer) corresponding to the controller module (CM#a: a is any positive integer) targeted for direct memory access is selected as illustrated in Step S10 of FIG. 8. Normally, the number which each controller module has agrees with the number assigned to the corresponding channel.

Then, in Step S11 a command is stored in the HW command queue of the selected channel b. In Step S12 the process of activating direct memory access for the command stored in the HW command queue is executed.

In the case of conducting the process of completion of direct memory access, it is judged whether or not there is a channel, for which data transfer by direct memory access by executing a command stored in the HW command queue has been completed, as illustrated in Step S20 of FIG. 9. At the time when it is confirmed that there is a channel, for which direct memory access data transfer has been completed, the process execution proceeds to Step S21, and then a completion-of-direct memory access process to complete direct memory access is executed. By executing the DMA completion process, the controller deletes a command that has been executed, and changes the number of commands to be executed stored in the HW command queue.

As for the flow charts of FIGS. 8 and 9, the upper limit of the number of commands of each channel in the HW command queue is not set. Therefore, a command of a channel which has been stored earlier cannot be executed in a predefined time, and a channel which has an earlier stored command will result in the occurrence of sinking.

Figure 11:
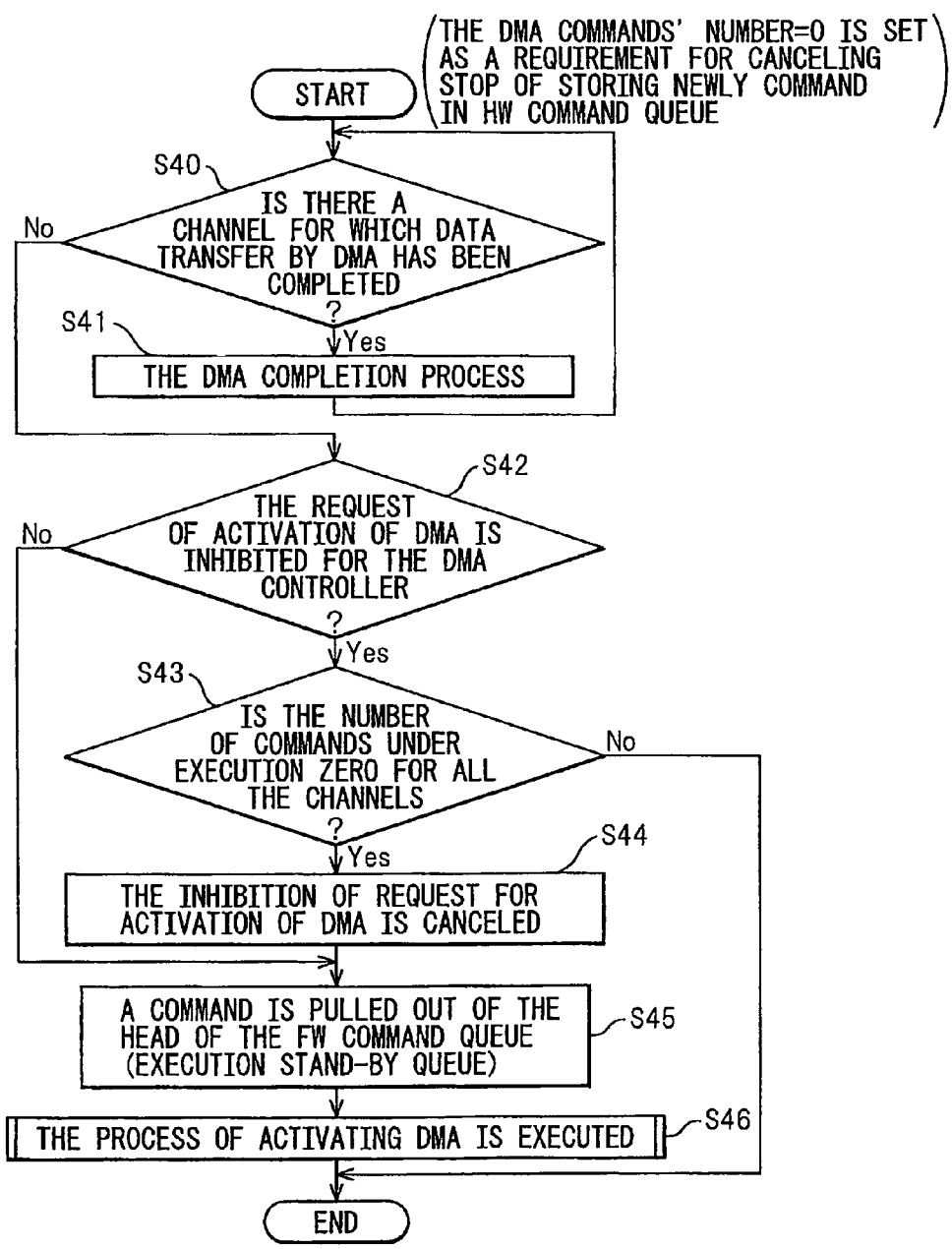
FIG. 11 is a flow chart for explaining the DMA completion process when the DMA commands' number=0 is set as a requirement for canceling the stopping of the storing new command in the data communication control device according to the embodiment.

FIG. 10 is a flow chart for explaining the DMA activation process when the DMA commands' number=0 is set as a requirement for canceling the stopping of new command storing in the data communication control device according to the embodiment. FIG. 11 is a flow chart for explaining the DMA completion process when the DMA commands' number=0 is set as a requirement for canceling the stopping of newly command storing in the data communication control device according to the embodiment. Here, only the upper limit of the number of commands which can be stuffed in the HW command queue is set, and the time when the number of commands of direct memory access under execution becomes zero is selected as a condition to cancel the stop of the operation of storing a new command in the HW command queue (a requirement for canceling the stopping of storing the new command).

In the case of executing the process of activating direct memory access in the data communication control device according to the embodiment, it is judged by the CPU whether or not the activation of direct memory access is allowed as described in Step S30 of FIG. 10. If CPU does not store a command queue in the HW command queue and stores the command in the FW command queue, the CPU do not request activation of direct memory access to the command stored in the FW command queue to the controller. Therefore, if there is a command in the FW command queue or the CPU attempts to store the command in the FW command queue, the CPU does not activate a direct memory access to such a command. The CPU can judge whether or not the activation of direct memory access is allowed by the controller. As described in the descriptions about step S36, the condition of activation of direct memory access is set.

When it is confirmed by the CPU that the request of activation of direct memory access is inhibited for the controller (S30 Yes), the process execution proceeds to Step S34, and a newly incoming command is stored by the CPU at the rearmost end of the FW command queue, i.e. execution stand-by queue.

On the other hand, when it is confirmed by the CPU that the request of activation of direct memory access is inhibited for the controller (S30 No), the process execution proceeds to Step S31, and the channel b corresponding to the controller module (CM#a) targeted for direct memory access is selected. Normally, the number which the controller module has is same as the number assigned to the corresponding channel.

Subsequently, in Step S32 a command is stored in the HW command queue of the selected channel b. In Step S33, the process of activating direct memory access to the command stored in the HW command queue is executed.

Further, in Step S35, it is judged by the CPU whether or not the number of direct memory access commands under execution in the channel b is over the upper limit. When it is confirmed by the CPU that the number of commands under execution is over the upper limit (S35 Yes), the process execution proceeds to Step S36, and the CPU sets a condition such that the request of activation of direct memory access to a new command is inhibited for the controller.

Still further, in the case of conducting the interrupt process at the time of completion of direct memory access, it is judged by the CPU whether or not there is a channel, for which direct memory access data transfer has been completed, as described in Step S40 of FIG. 11. When it is confirmed by the CPU that there is a channel, for which data transfer by direct memory access has been completed, the process execution proceeds to Step S41, and the completion-of-direct memory access process is executed.

In contrast, in the case where it is confirmed by the CPU that there is not a channel, for which data transfer by direct memory access has been completed, the process execution proceeds to Step S42. Then, it is judged by the CPU whether or not the request of activation of direct memory access is inhibited for the controller.

When it is confirmed by the CPU that the request of activation of direct memory access is inhibited for the controller (S42 Yes), the process execution proceeds to Step S43. Then, it is judged by the CPU whether or not the number of commands under execution is zero for all the channels.

When it is confirmed by the CPU that the number of commands under execution is zero for all the channels (S43 Yes), the process execution proceeds to Step S44. Then, the inhibition of request for activation of direct memory access to a new data by the controller is canceled by the CPU, and the process execution proceeds to Step S45.

Further, in Step S45, a command is pulled out of the head of the FW command queue (execution stand-by queue) and the pulled command is stored in the HW command queue by the CPU.

Still further, in Step S46 the commands stored in the HW command queue are executed from the head in turn, thereby resuming the process of activating direct memory access.

In the flow charts of FIGS. 10 and 11, at the time when it is confirmed by the CPU that the number of commands in the HW command queue is larger than the upper limit, the operation of storing a new command in the HW command queue is stopped, and the operation of storing the new command in the HW command queue is restarted at the time when the number of commands of direct memory access under execution becomes zero. Therefore, a command of a channel, which has been stored earlier, is made less prone to being passed by a command of another channel, which has been stored later, whereby the occurrence of sinking in a channel related to the earlier stored command can be prevented. However, the fact that the number of commands of direct memory access under execution becomes zero is tantamount to that no controller is working at that moment, and therefore the efficiency of using the hardware part of the controller is lowered somewhat.

Figure 12:
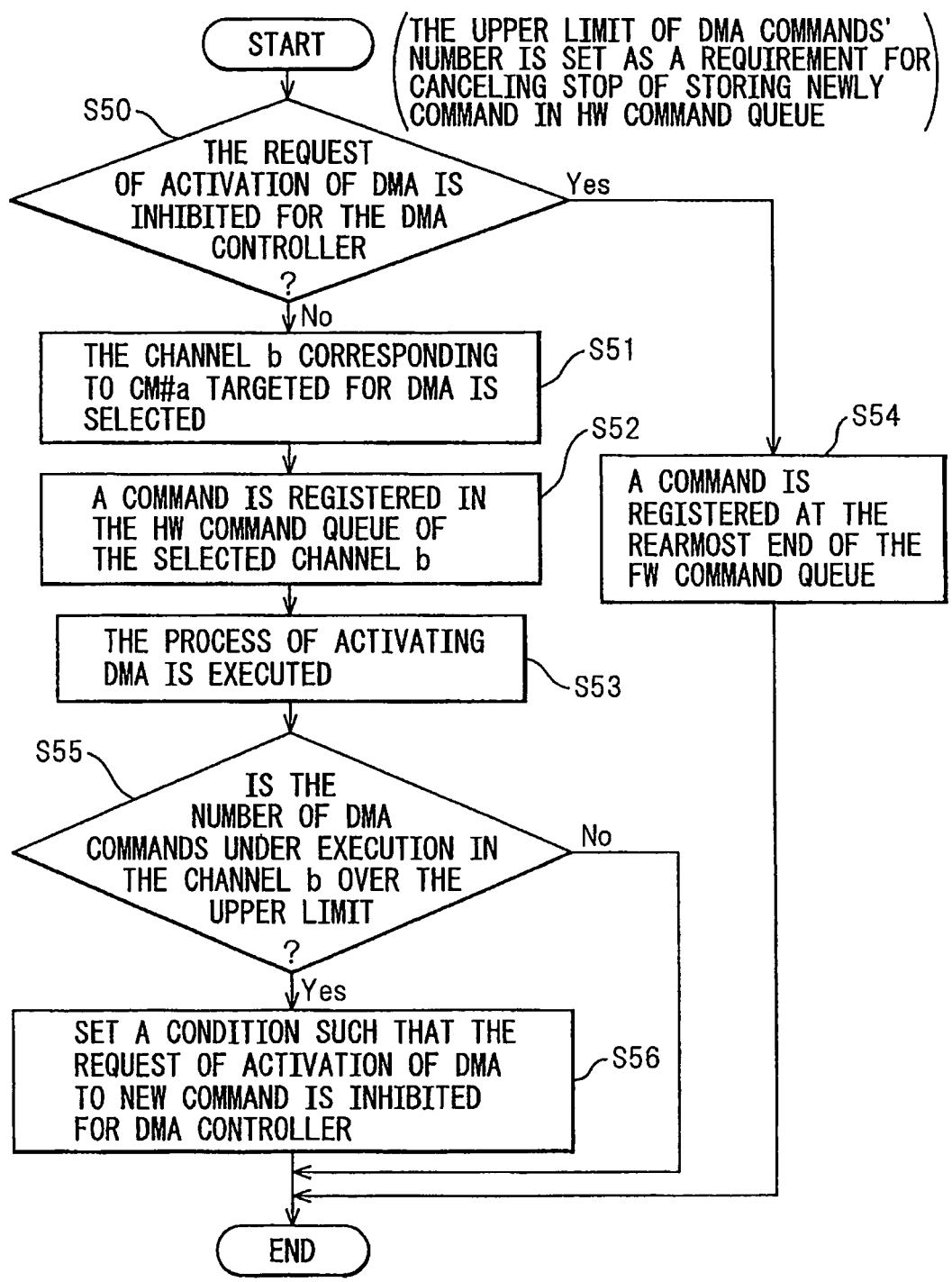
FIG. 12 is a flow chart for explaining the DMA activation process when the upper limit of DMA commands' number is set as a requirement for canceling the stopping of the storing new command in the data communication control device according to the embodiment.
Figure 13:
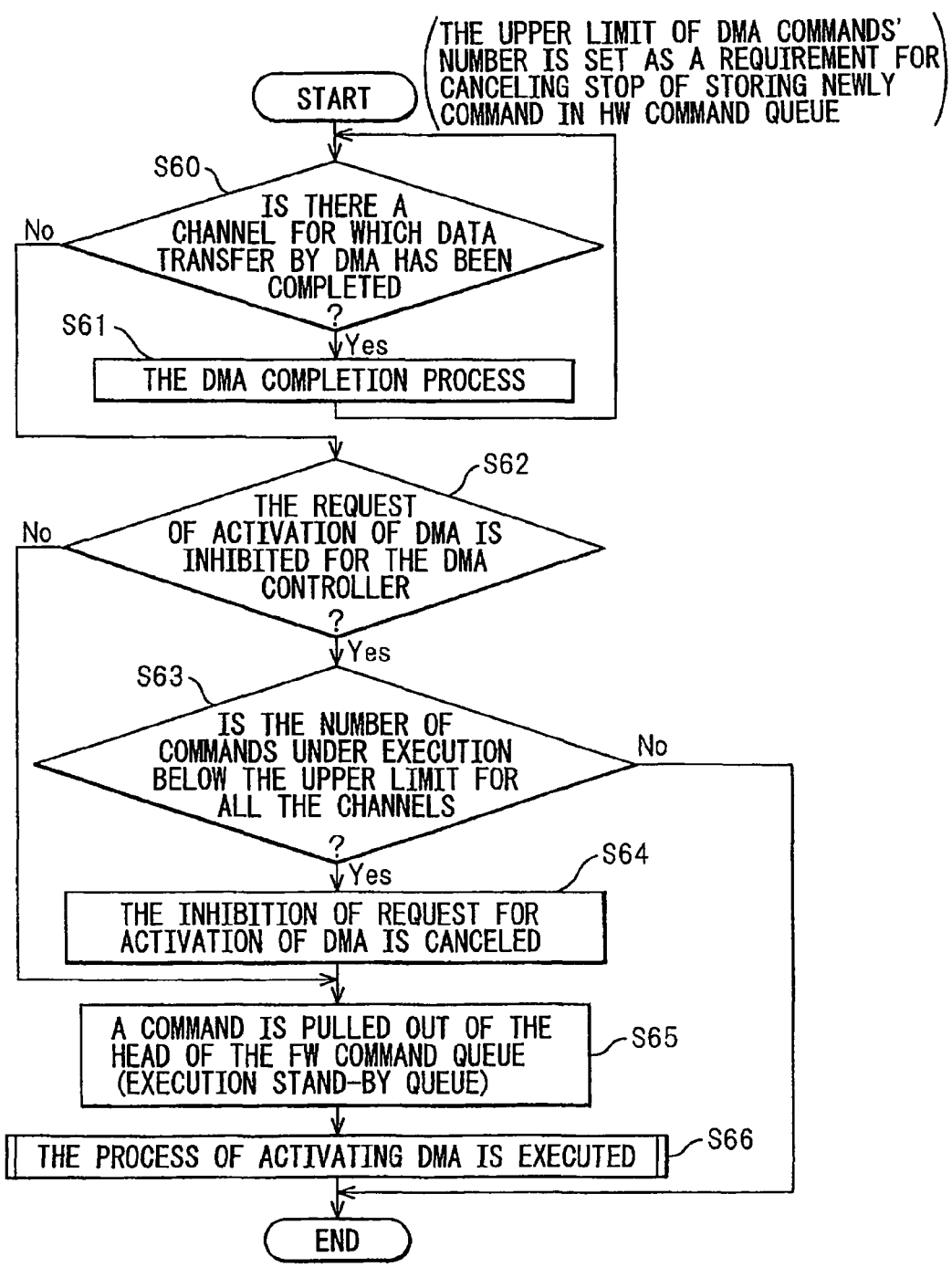
FIG. 13 is a flow chart for explaining the DMA completion process when the upper limit of DMA commands' number is set as a requirement for canceling the stopping of the storing new command in the data communication control device according to the embodiment.

FIG. 12 is a flow chart for explaining the DMA activation process when the upper limit of DMA commands' number is set as a requirement for canceling the stopping of newly command storing in the data communication control device according to the embodiment. FIG. 13 is a flow chart for explaining the DMA completion process when the upper limit of DMA commands' number is set as a requirement for canceling the stopping of the storing the new command in the data communication control device according to the embodiment. Here, only the upper limit of the number of commands which can be stuffed in the HW command queue is set, and the time when the number of commands of direct memory access under execution goes below the upper limit is selected as a condition to cancel the stop of the operation of storing a new command in the HW command queue (a requirement for canceling the stopping of the storing new command).

In the case where the process of activating direct memory access is executed in the data communication control device according to the embodiment, it is judged by the CPU in Step S50 of FIG. 12 whether or not the request of activation of direct memory access is inhibited for the controller as in the case of the flow chart of FIG. 10 described above.

When it is confirmed by the CPU that the request of activation of direct memory access is inhibited for the controller, the process execution proceeds to Step S54, and a newly incoming command is stored by the CPU at the rearmost end of the FW command queue, i.e. execution stand-by queue.

On the other hand, when it is confirmed by the CPU that the request of activation of direct memory access is inhibited for the controller, the process execution proceeds to Step S51, and the channel b corresponding to the controller module (CM#a) targeted for direct memory access is selected. Normally, the number which the controller module has is same as the number assigned to the corresponding channel.

Subsequently, in Step S52, a command is stored in the HW command queue of the selected channel b. In Step S53, the process of activating direct memory access is executed.

Further, in Step S55, it is judged by the CPU whether or not the number of direct memory access commands under execution in the channel b is over the upper limit. When it is confirmed by the CPU that the number of commands under execution is over the upper limit, the process execution proceeds to Step S56, and the CPU set a condition such that the request of activation of direct memory access to new data is inhibited for the controller.

Still further, in the case of conducting the interrupt process at the time of completion of direct memory access, it is judged by the CPU whether or not there is a channel, for which direct memory access data transfer has been completed, as described in Step S60 of FIG. 13. When it is confirmed by the CPU that there is a channel, for which data transfer by direct memory access has been completed, the process execution proceeds to Step S61, and the completion-of-direct memory access process is executed.

In contrast, in the case where it is confirmed by the CPU that there is not a channel, for which data transfer by direct memory access has been completed, the process execution proceeds to Step S62. Then, it is judged by the CPU whether or not the request of activation of direct memory access is inhibited for the controller.

When it is confirmed by the CPU that the request of activation of direct memory access is inhibited for the controller, the process execution proceeds to Step S63. Then, it is judged by the CPU whether or not the number of commands under execution is below the upper limit for all the channels.

When it is confirmed by the CPU that the number of commands under execution is not over the upper limit for all the channels, the process execution proceeds to Step S64. Then, the inhibition of direct memory access to a new data by the controller is canceled by the CPU.

Further, in Step S65, a command is pulled out of the head of the FW command queue (execution stand-by queue) and the pulled command is stored in the HW command queue.

Still further, in Step S66 the commands stored in the HW command queue are executed from the head in turn, thereby resuming the process of activating direct memory access.

In the flow charts of FIGS. 12 and 13, at the time when it is confirmed by the CPU that the number of commands in the HW command queue is larger than the upper limit, the operation of storing a new command in the HW command queue is stopped, and the operation of storing a new command in the HW command queue is restarted at the time when the number of commands of direct memory access under execution goes below the upper limit. Therefore, a command of a channel, which has been stored earlier, is made less prone to being passed by a command of another channel, which has been stored later. The data communication control device can execute the commands stored in the HW command queue in predetermined order. Therefore, the data communication control device can send data based on the predetermined order, and, prevent the occurrence of sinking of the command stored earlier.

Figure 14:
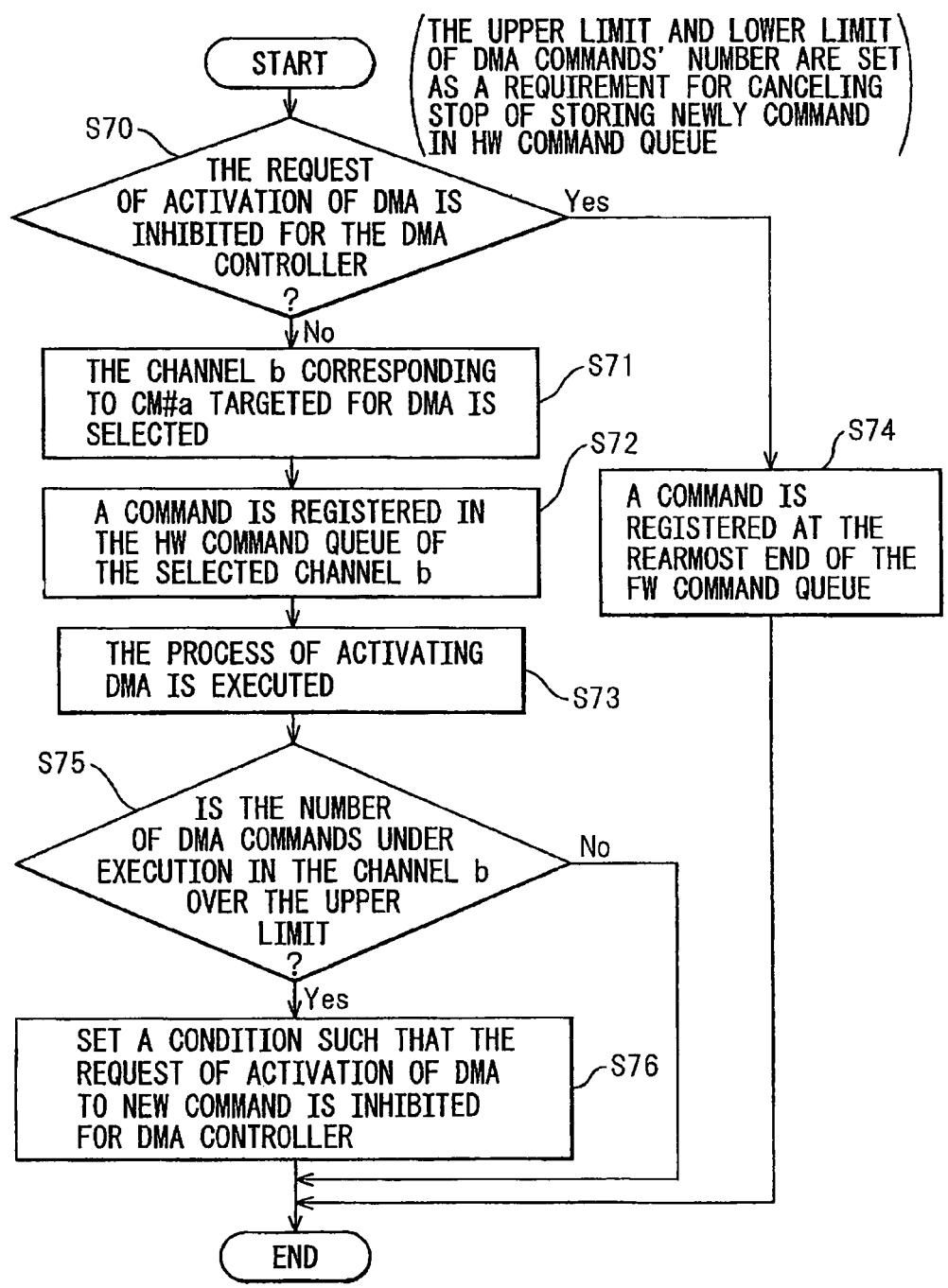
FIG. 14 is a flow chart for explaining the DMA activation process when the upper limit of the DMA commands' number and the lower limit thereof are set as a requirement for canceling the stopping of the storing new command in the data communication control device according to the embodiment; and, FIG. 15 is a flow chart for explaining the DMA completion process when the upper limit of the DMA commands' number and the lower limit thereof are set as a requirement for canceling the stopping of the storing new command in the data communication control device according to the embodiment.
Figure 15:
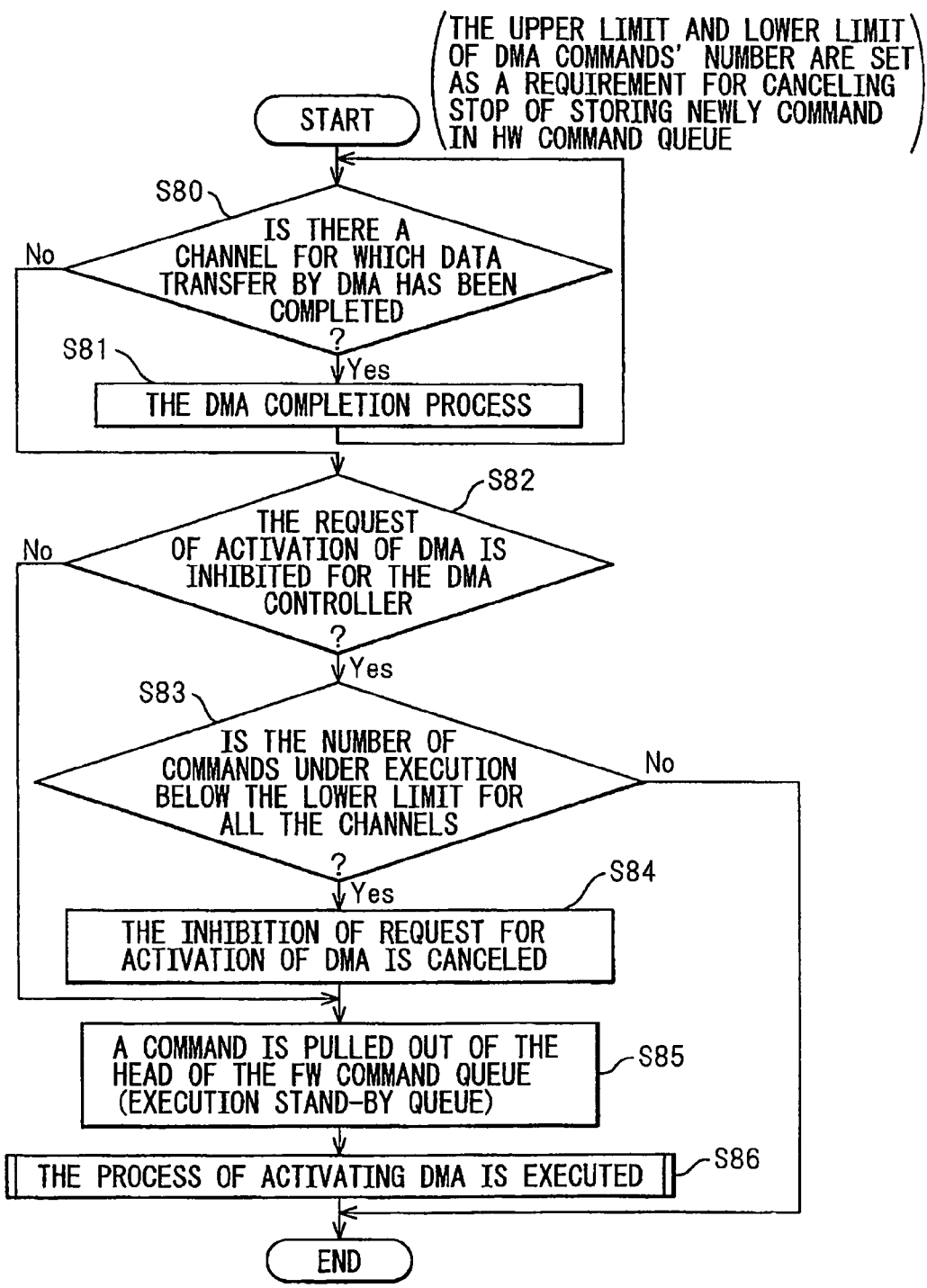

FIG. 14 is a flow chart for explaining the DMA activation process when the upper limit of the DMA commands' number and the lower limit thereof are set as a requirement for canceling the stopping of the storing new command in the data communication control device according to the embodiment. FIG. 15 is a flow chart for explaining the DMA completion process when the upper limit of the DMA commands' number and the lower limit thereof are set as a requirement for canceling the stopping of the storing new command in the data communication control device according to the embodiment. Here, the upper and lower limits of the number of commands which can be stuffed in the HW command queue are set, and the time when the number of commands of direct memory access under execution goes below the lower limit is selected as a condition to cancel the stop of the operation of storing a new command in the HW command queue (a requirement for canceling the stopping of the storing of the new command).

In the case where the process of activating direct memory access is executed in the data communication control device according to the embodiment, it is judged by the CPU in Step S70 of FIG. 14 whether or not the request of activation of direct memory access is inhibited for the controller as in the case of the flow chart of FIG. 12 described above.

When it is confirmed by the CPU that the request of activation of direct memory access is inhibited for the controller, the process execution proceeds to Step S74, and a newly incoming command is stored by the CPU at the rearmost end of the FW command queue, i.e. execution stand-by queue.

On the other hand, when it is confirmed by the CPU that the request of activation of direct memory access is inhibited for the controller, the process execution proceeds to Step S71, and the channel b corresponding to the controller module (CM#a) targeted for direct memory access is selected. Normally, the number which the controller module has is same as the number assigned to the corresponding channel.

Subsequently, in Step S72, a command is stored in the HW command queue of the selected channel b. In Step S73, the process of activating direct memory access is executed.

Further, in Step S75, it is judged by the CPU whether or not the number of direct memory access commands under execution in the channel b is over the upper limit. When it is confirmed by the CPU that the number of commands under execution is over the upper limit, the process execution proceeds to Step S76, and the CPU sets a condition such that the request of activation of direct memory access to new data is inhibited for controller.

Still further, in the case of conducting the interrupt process at the time of completion of direct memory access, it is judged by the CPU whether or not there is a channel, for which direct memory access data transfer has been completed, as described in Step S80 of FIG. 15. When it is confirmed by the CPU that there is a channel, for which data transfer by direct memory access has been completed, the process execution proceeds to Step S81, and the completion-of-direct memory access process is executed.

In contrast, in the case where it is confirmed by the CPU that there is not a channel, for which data transfer by direct memory access has been completed, the process execution proceeds to Step S82. Then, it is judged by the CPU whether or not the request of activation of direct memory access is inhibited for the controller.

When it is confirmed by the CPU that the request of activation of direct memory access is inhibited for the controller, the process execution proceeds to Step S83. Then, it is judged by the CPU whether or not the number of commands under execution is below the lower limit for all the channels.

When it is confirmed by the CPU that the number of commands under execution is below the lower limit for all the channels, the process execution proceeds to Step S84. Then, the inhibition of direct memory access to a new data by the controller is canceled by the CPU.

Further, in Step S85, a command is pulled out of the head of the FW command queue (execution stand-by queue) and the pulled command is stored in the HW command queue.

Still further, in Step S86, the commands stored in the HW command queue are executed from the head in turn, thereby resuming the process of activating direct memory access.

In the flow charts of FIGS. 14 and 15, at the time when it is confirmed that the number of commands in the HW command queue exceeds the upper limit, the operation of storing a new command in the HW command queue is stopped, and the operation of storing a new command in the HW command queue is restarted at the time when the number of commands of direct memory access under execution goes below the lower limit. Therefore, a command of a channel, which has been stored earlier, is made less prone to being passed by a command of another channel, which has been stored later. The data communication control device can execute the commands stored in the HW command queue in predetermined order. Therefore, the data communication control device can send data based on the predetermined order, and, prevent the occurrence of sinking of the command stored earlier.

It is made possible by setting the lower limit of the number of commands in the HW command queue to prevent the controller from staying in its unworking condition under a situation where the FW command queue has therein a command waiting to be executed. In addition, a period during which no new command is stored in the HW command queue after the number of commands in the HW command queue has exceeded the upper limit is secured, whereby it is made possible to process commands in the HW command queue according to the order at that time to widely reduce the number of times a command stuffed in a certain channel earlier is passed by a command stuffed later. Further, there still remains a margin before the upper limit at the time of restarting a command in the FW command queue, and therefore it becomes possible to store quite a large number of commands at a time, and the efficiency of processing by the firmware is made better in comparison to the case of the flow charts of FIGS. 12 and 13 described above.

As stated above, the disclosed data communication control device, data communication controlling method and program therefor are arranged to have the following features: one second data storing part composed of the FW command queue or the like, which is managed by firmware is prepared; the upper limit of the number of commands to be stuffed in the first data storing part composed of the HW command queue or the like in the controller is set in advance, and the lower limit is also set previously as required; when the number of commands of a certain channel stuffed in the first data storing part exceeds the upper limit, the operation of storing a command of a transfer destination in the first data storing part is stopped; and a newly incoming command is held in the second data storing part. Also, the disclosed data communication control device, data communication controlling method and program therefor are arranged to have the following features: at the time when the number of commands of all the channels stuffed in the first data storing part decreases below the lower limit, the commands held in the second data storing part are pulled out of the head and stored in the first data storing part, and the commands stored in the first data storing part are executed from the head in order.

Thus, the sinking depth of a command stuffed in the first data storing part such as the HW command queue is made shallower, and it becomes possible to manage a command left over without being stored in the first data storing part while keeping the command in the second data storing part such as the only FW command queue. As a result, even when a bias arises in the data size or number of commands, a command of a channel, which has been stuffed in the first data storing part earlier, is made less prone to being passed by a command of another channel, which has been stuffed later, whereby the occurrence of sinking of the command stuffed earlier can be prevented.

All examples and condition language recited herein are intended for pedagogical purpose to aid the reader in understanding the principles of the invention and the concepts contributed by the inventor to furthering the art, and are to be construed as being without limitation to such specifically recited examples and condition, nor does the organization of such examples in the specification relate to a showing of the superiority and inferiority of the invention. Although the embodiment(s) of the present invention(s) has been described in detail, it should be understood that the various changes, substitutions, and alterations could be made hereto without departing from the spirit and scope of the invention.

What is claimed is:

1. A data communication control device comprising:
a controller comprising a plurality of channels each of which is prepared for one of multiple data transfer destinations and a plurality of command queues, each of which is allocated corresponding to each channel and which stores a command for data transfer through each channel, each of the plurality of command queues having a corresponding threshold, the controller executes a command in order from a head in each command queue; and,
an overall controller that stores a command in one of the command queues when the number of commands stored in any one of the command queues is not over a first threshold value, the first threshold value indicating an upper limit of the number of commands stored in the any one of the command queues, and stops storing the command in all the command queues and stores the command in a waiting queue when the number of commands in anyone of the command queues is over the first threshold value, wherein the overall controller pulls the command out in order from a head in the waiting queue and stores the pulled command in a corresponding one of the command queues which is associated with the destination of the pulled command when the number of commands stored in each command queue is not more than a second threshold value which indicates a restart of queuing to the plurality of command queues.

2. The data communication control device according to claim 1, wherein the overall controller does not store the command in the command queue of the first storing part and stores the command in the waiting queue of the second storing part, when there is a command in the waiting queue of the second data storing part.

3. The data communication control device according to claim 1, wherein the second threshold value is zero.

4. The data communication control device according to claim 1, wherein the second threshold value is the same as the first threshold value.

5. The data communication control device of according to claim 1, wherein the second threshold value is below-the first threshold value.

6. A method of controlling data transfer, comprising:

storing a command for data transfer in one of a plurality of command queues, each of the command queues corresponding to one of a plurality of channels, each of the command queues having a corresponding threshold, each of the command queues prepared for one of multiple data transfer destinations when the number of commands stored in any one of the command queues is not over a first threshold value, the first threshold value indicating an upper limit of the number of commands stored in the any one of the command queues, stopping the storing the command in all the command queues and storing the command in a waiting queue when the number of commands in any one of the command queues is over the first threshold value, and pulling a command out of the waiting queue from a head of the waiting queue and storing the pulled command in a corresponding one of the command queues which is associated with a destination of the pulled command when the number of commands stored in each command queue is not more than a second threshold value which indicates a restart of queuing to the plurality of command queues.

7. The method according to claim 6, further comprising:

failing to store, by the controller, the command in the command queue and storing the command in the waiting queue when there is a command in the waiting queue.

8. The method of according to claim 6, wherein the second threshold value is zero.

9. The method according to claim 6, wherein the second threshold value is the same as the first threshold value.

10. The method according to claim 6, wherein the second threshold value is below the first threshold value.

* * * * *